R. M. Abbe,
Hog Pen.
No. 11,592. Patented Aug. 29, 1854.
Fig. 1.
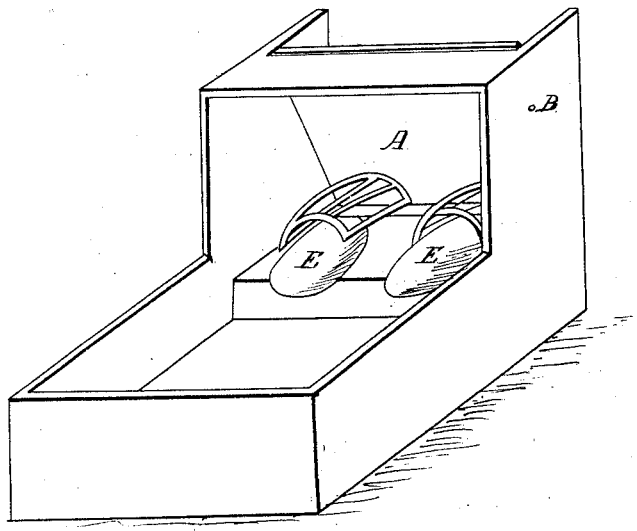
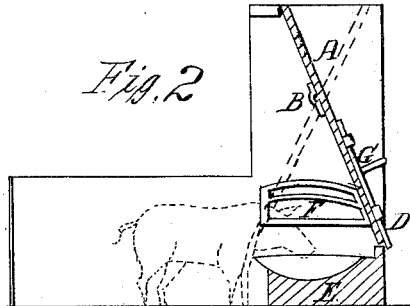
Fig. 2.
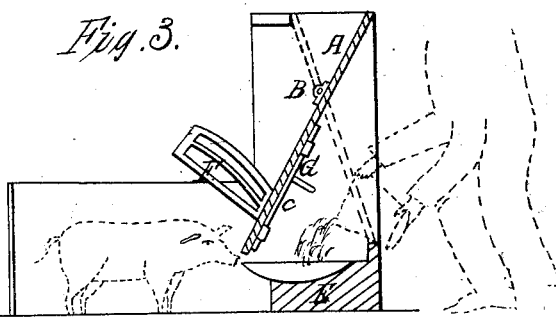
Fig. 3.

UNITED STATES PATENT OFFICE.

ROBERT M. ABBE, OF THOMPSONVILLE, CONNECTICUT.

HOG-PEN.

Specification of Letters Patent No. 11,592, dated August 29, 1854.

*To all whom it may concern:*

Be it known that I, ROBERT M. ABBE, of the town of Thompsonville, in the State of Connecticut, have invented a new and useful Improvement in the Arrangement and Construction of Hog-Pens and Feeding-Troughs for the Same; and I do hereby declare that the following is a full and exact description of the same, reference being had to the accompanying drawings and to letters of reference marked thereon.

The nature of my invention consists in the peculiar construction of the guards to the trough.

To enable others skilled in the art to make and use my invention I will proceed to describe the construction and operation.

The plan describes the pen.

No. 1 is an angular view showing the interior; No. 2 is a section showing the swinging front when closed and the hogs are feeding; No. 3 is a section showing the swinging front when open to put in the food or to clean out the troughs, preventing the hogs from interfering in the operation.

In the first place I build a pen of the necessary size such as the number of hogs or circumstances may require, of the usual materials of planks, &c., at the front part of the same I make my improvements as follows:

Letter A is a swinging front hanging on pivots or hinges at B. This front is intended to swing inward as at C, when feeding the hogs or cleaning out the troughs, preventing the hogs from interfering in the operation—when the food is put into the troughs the frame is brought back and made fast at the lower part at D, by means of a sliding bar or some other contrivance, thus giving the hogs free access to their food.

Letters E are the feeding troughs made of cast iron of a concave oval or round shape and placed on a frame so that they cannot be disturbed—the form of the same being such as to give means of cleaning them out thoroughly and thus preventing any surplus or remnants from souring or becoming offensive, which frequently occurs in the old method and is injurious to the hogs.

Letters F are the guards made of iron. These guards are intended to prevent the hogs from interfering with each other while feeding and also are so fixed on the front swinging frame that they can be raised or lowered to suit the height or size of the hog, and when in use are put just so high as to allow the hog to pass in his head and neck to feed, but cannot get his feet in, thus preventing the fouling or wasting the food.

G is the sliding bar for fastening the front.

This method of constructing hog pens is both economical and useful, economical in the prevention of waste and the great saving of food, which I calculate to be at least about 25 per cent, a saving of importance where numbers of hogs are kept. It is useful for keeping the feeding troughs clean, and by that means preventing the souring and spoiling (which is so common in the old way, and injurious to the health and growth of the hogs).

The expense of this arrangement is comparatively trifling. The cast iron troughs may be made light in weight; they also can be so fixed on the frame that the under part being hollow when hogs are kept in a distillery, brewery, &c., the steam can be introduced under the trough to keep the food warm and also from freezing in cold weather.

The swinging front can be raised up so as to let out and admit the hogs in or out.

What I claim as my invention and desire to secure by Letters Patent, is—

The swinging guard of the pen, in the manner and for the purpose substantially as herein set forth and described.

R. M. ABBE.

Witnesses:
R. G. DOAKI,
WM. VIND.